Nov. 11, 1924.

M. C. GILLETT 1,515,028

GRATE APPARATUS FOR WATER HEATERS

Filed Jan. 18, 1924

INVENTOR
*Merriman C. Gillett*

BY
*F. A. Witherspoon*
ATTORNEY

Nov. 11, 1924.
M. C. GILLETT
1,515,028
GRATE APPARATUS FOR WATER HEATERS
Filed Jan. 18, 1924
4 Sheets-Sheet 3
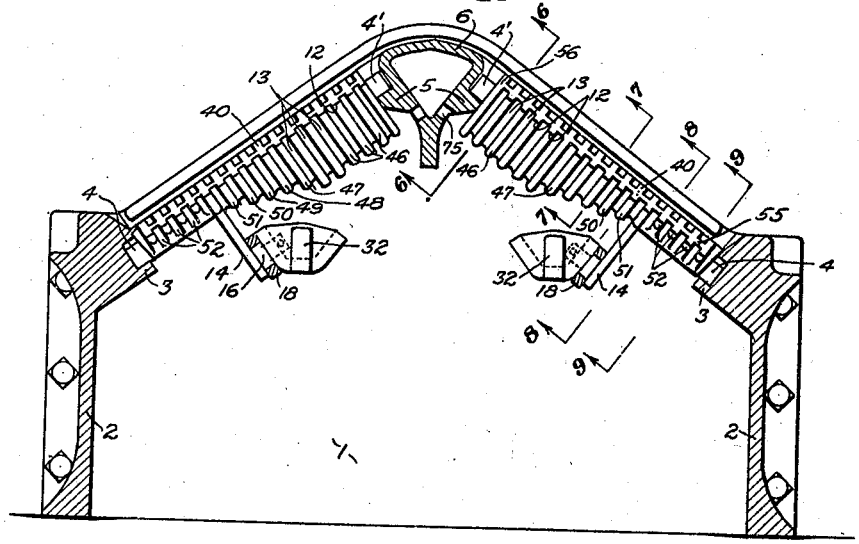
FIG. 4.
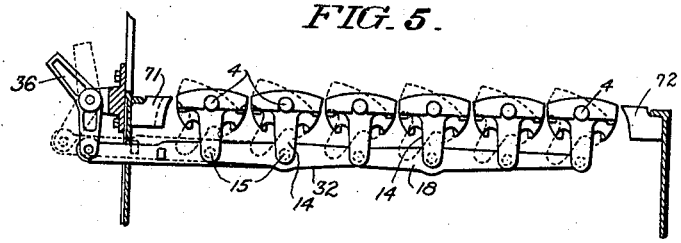
FIG. 5.
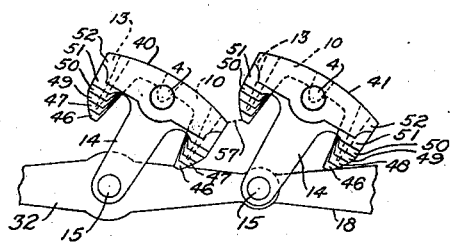
FIG. 5ª
INVENTOR
Merriman C. Gillett,
BY
F. A. Witherspoon
ATTORNEY Nov. 11, 1924.

M. C. GILLETT 1,515,028

GRATE APPARATUS FOR WATER HEATERS

Filed Jan. 18, 1924      4 Sheets-Sheet 4

INVENTOR
Merriman C Gillett,
BY
F. A. Witherspoon
ATTORNEY

Patented Nov. 11, 1924.                                   1,515,028

UNITED STATES PATENT OFFICE.

MERRIMAN C. GILLETT, OF PHILADELPHIA, PENNSYLVANIA, ASSIGNOR TO STANDARD HEATER COMPANY, OF WILLIAMSPORT, PENNSYLVANIA, A CORPORATION OF PENNSYLVANIA.

GRATE APPARATUS FOR WATER HEATERS.

Application filed January 18, 1924. Serial No. 687,150.

*To all whom it may concern:*

Be it known that I, MERRIMAN C. GILLETT, a citizen of the United States, residing at Philadelphia, in the county of Philadelphia and State of Pennsylvania, have invented certain new and useful Improvements in Grate Apparatus for Water Heaters; and I do hereby declare the following to be a full, clear, and exact description of the invention, such as will enable others skilled in the art to which it appertains to make and use the same.

This invention relates to grate apparatus for water heaters, and has for its object to provide a grate mechanism which will be simple in construction, comparatively inexpensive to manufacture, and more efficient in use than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 4 is a transverse sectional view taken on the line 4—4 of Figure 1, looking in the direction of the arrows;

Figure 5 is a longitudinal side elevational view illustrating the operation of this invention;

Figure 6:
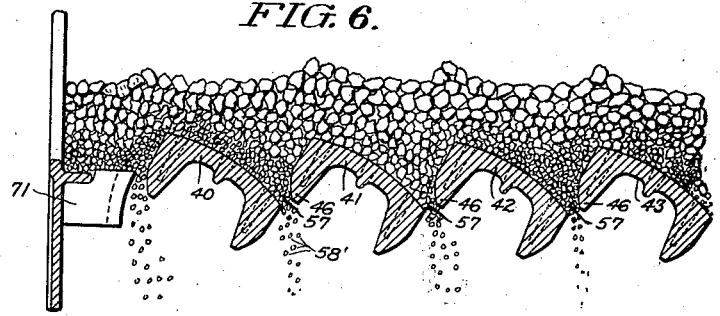
Figure 7:
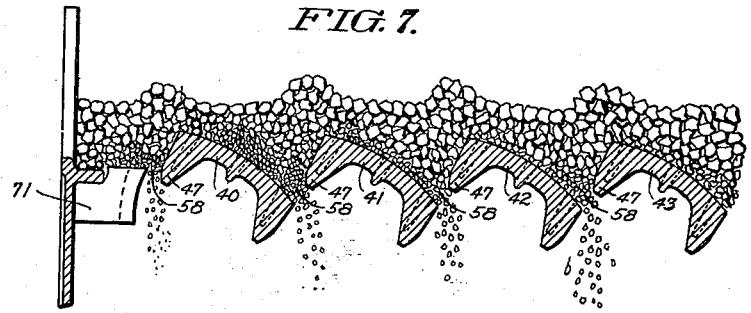
Figure 8:
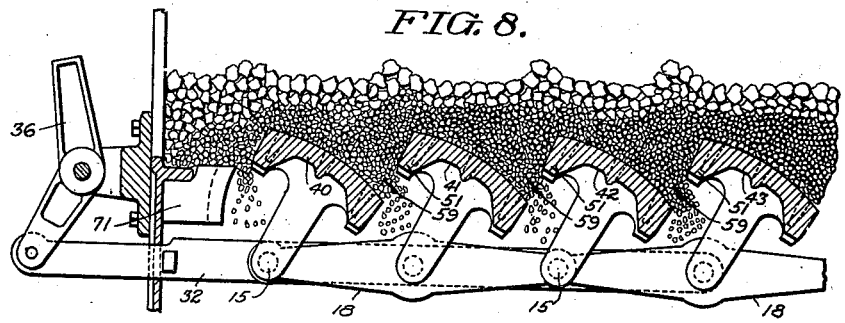
Figure 9:
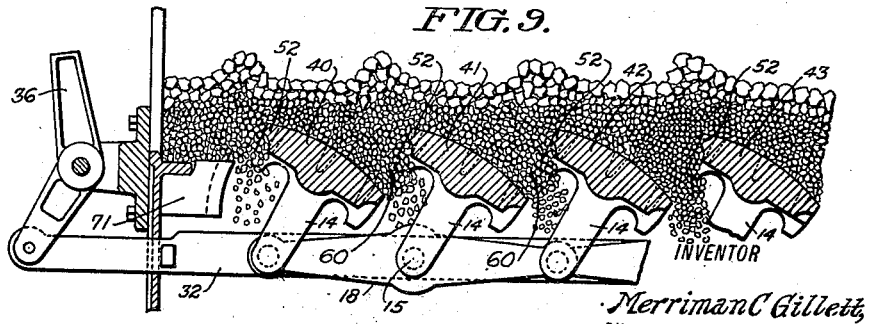

Figure 5ª is a diagrammatic perspective view illustrating the successive wider openings of the grate bars toward the lower ends of the same;

Figure 6 is a sectional view taken on the line 6—6 of Figure 4, looking in the direction of the arrows;

Figure 7 is a sectional view taken on the line 7—7 of Figure 4, looking in the direction of the arrows;

Figure 8 is a sectional view taken on the line 8—8 of Figure 4, looking in the direction of the arrows; and Figure 9 is a sectional view taken on the line 9—9 of Figure 4, looking in the direction of the arrows.

Figure 1:
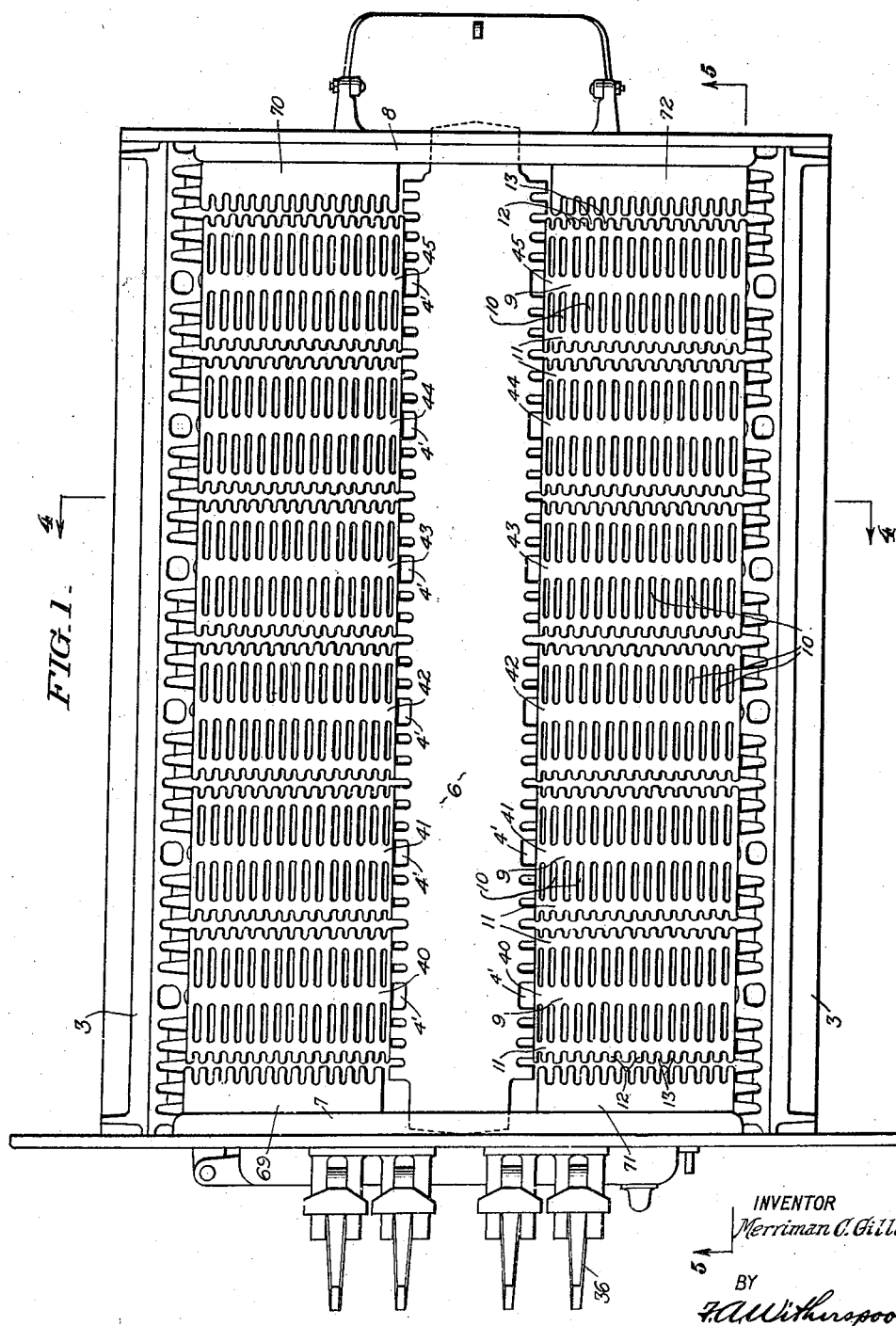
Figure 1 is a plan view of a grate made in accordance with this invention.

1 indicates the ash pit of a furnace, 2 the side walls thereof providing bearings 3 for the lower trunnions 4 of a plurality of grate bars numbered from 40 to 45, and which are preferably disposed in an inclined relation, as shown in Figure 4. These grate bars are also provided with upper pivots or trunnions 4' which rest in upper bearings 5 in the hollow central grate bar supporting member 6, as illustrated. As will be clear from Figure 1, the central supporting member 6 rests at each end in the supports 7 and 8, which are disposed at right angles to the bearings 3 and each grate bar 40 to 45 on each side of said member 6 is provided with a central imperforate portion 9 and with a row of perforations 10 on each side of said central portion. At the ends of the perforations 10 farthest from the portion 9 of each bar there is another solid imperforate portion 11 on each bar, and extending from said imperforate portions 11 on each side of each bar there are a plurality of fingers 12 separated by perforations or slots 13 as shown.

Figure 2:
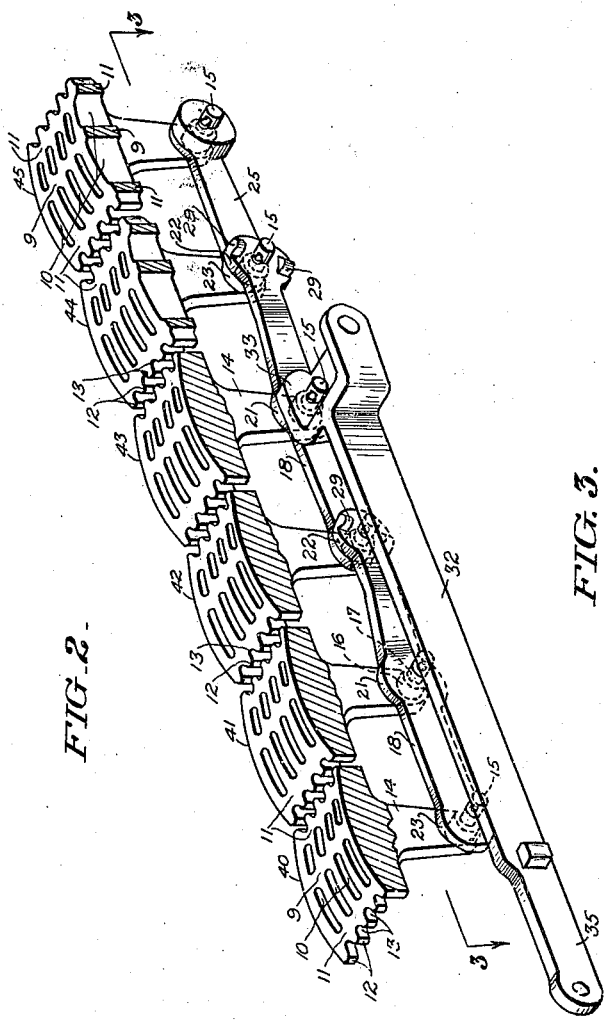
Figure 2 is a partially sectional view in perspective of a portion of the parts shown in Figure 1.

As best illustrated in Figures 2 and 5, from the under side of each bar 40 to 45 there extends a downwardly depending pivoting member 14 provided with a pivot 15, composed of a larger cylindrical portion 16, and a smaller cylindrical portion 17. 18 represents a plurality of grate bar actuating links, each provided with three perforations. Two of these perforations, namely the one near the middle 21 of a bar 18, and the other at the end 23 of the bar, are made sufficiently large to fit over the larger trunnion portion 16 of the pivots 15, while the perforation in the other end 22 of each link 18 is so small that it will only fit over the smaller trunnion portion 17 of the pivots 15. Further, said links 18 are bent or deflected as at 20, Figure 3, in that portion 30 which extends from the middle portion 21 of said link to the end portion 22 thereof.

Figure 3:
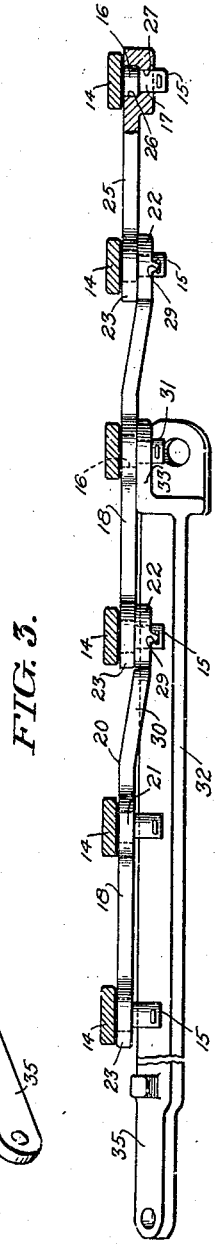
Figure 3 is a sectional view taken on the line 3—3 of Figure 2, looking in the direction of the arrows.

The result is in assembling said links 18, one end 23 of each link fits over an enlarged trunnion portion 16 of a pivot 15; the middle portion of each link fits over an enlarged trunnion portion 16 of an adjacent pivot 15, while the other end 22 of each link fits over a small trunnion portion 17 of a pivot 15, which is already occupied by the end 23 of an adjacent link 18, all as will be clear from Figure 3. The last link 25 may only comprise a span between two adjacent members 14, in which case its end 23 fits over an enlarged trunnion portion 16, as in the previous cases, while its other end portion is provided with a countersunk depression 26 which fits the enlarged trunnion portion 16 of a pivot 15, and said countersunk member 26 is perforated at its bottom to provide a smaller hole 27 which fits the smaller portion 17 of said pivot 15. Each link 18 at its end 22 is provided with one or more lugs 29, projecting away from the grate bars, so that said links 18 can not be turned through an angle of 180° and fitted to the pivots 15. In other words, owing to the bent portion 30 and to said lugs 29 of the links 18, it is impossible to put the parts together in the wrong way, so that mistakes in assemblage are effectually avoided. To one of the pivoting members such as 31 is fitted the shaking bar or member 32 by means of a flange 33 extending over said pivot 31, and to the end 35 of said member 32 is secured any suitable shaking means such as the lever 36, all as will be readily understood from the drawings.

Coming back to the lugs 12 and slots 13, it will be seen from Figures 4, 5ª, and 6 that said lugs project downwardly on each side of the grate bars toward the pivots 15 to form curved flanges of different lengths and that said slots separate said flanges. That is, the curved flanges 46, 47, 48, 49, 50, 51, and 52 are successively of shorter lengths, and it thus results when the grate bars are tilted from their full line positions shown in Figure 5 to their dotted line positions shown in said figure, the openings between the curved top of one bar 40 and the bottoms of the successive flanges 46 to 52, get wider and wider as we reach the lower edge 55 of the grate section. To make this action clear, we may consider Figures 4, 5 and 5ª, of the drawings, and remember that in Figures 5 and 5ª we are looking from the lower ends 55 of the grate bars, as seen in Figure 4, toward their upper ends 56, so that the said flanges 52 have practically no length, but are mere lugs while the succeeding flanges 51, 50, etc., get longer and longer as we reach said upper end 56 of the grate bars. On the other hand, the distance 57 represented by the dotted line extending between the curved top surface of a preceding grate bar such as 40 and the lower edge of the longest flange 46 of a succeeding grate bar such as 41, is quite small, so that only very small particles 58', and very few of them can pass through this opening, as will be clear from Figure 6. A similar small opening will be formed between the longest flange 46 of the grate bar 42 and the curved top surface of the grate bar 41. In the same way, similar small openings 57 all the way along the top portions of the grate sections near the supporting member 6 will be formed between pairs of grate bars such as 42 and 43, 43 and 44, etc., due to the long flanges 46 of a succeeding bar extending to points quite close to the curved top surface of a preceding bar, all as will be clear from Figures 1, 4 and 6. However, as we recede from said supporting member 6 or from the upper trunnions 4', of the grate bars toward their lower trunnions we reach the next shorter flanges 47, see Figures 4 and 5ª, with which each grate bar 40 to 45 is provided, and the distances 58 between the lower edges of these flanges 47 of a succeeding grate bar such as 41 and the curved top surface of a preceding bar such as 40, will be found to be greater than are said distances 57 above discussed, all as will be clear from Figures 5ª and 7.

In the same way, the flanges 49 of each bar 40 to 45 being shorter than are the preceding flanges 46 to 48, the spaces between the lower edges of said flanges 49 of a succeeding grate bar and the top curved surfaces of a preceding grate bar will be still greater than are the previously discussed distances 57 and 58, all as will be clear from Figures 4 and 8.

Considering another specific example, however, as is furnished by the view taken on the line 8—8 of Figure 4, looking in the direction of the arrows, and which view is shown in Figure 8 of the drawings, it will be observed from an inspection of Figure 5ª, that the distance 59 from the lower edge of the flange 51 of a succeeding bar such as 41, and the lower top surface of a preceding bar such as 40 is much greater than are the previously discussed distances and that similar distances 59 will extend all along the length of the grate sections between succeeding and preceding bars, as will be clear from Figure 8. In the same way if we consider the sizes of the openings to be found along the plane 9—9 of Figure 4, which is illustrated in Figure 9, we will see that the distances 60 between the lower edge 52 of a lug or flange on a succeeding bar 41 and the top curved surface of a preceding bar 40 is still very much greater than are the preceding distances discussed above, and that similar distances 60 will extend all along the grate sections between succeeding and preceding bars, if we follow a line parallel to the central supporting section 6, as will also be clear from Figure 9.

Stated in other words, when this grate is operated by reciprocating the shaking member 32, and its associated parts, there will be relatively small openings provided between preceding and succeeding grate bars in a line close to and parallel to the central supporting member 6, while as we get farther from said supporting member 6, there will be along similar parallel lines wider openings between succeeding and preceding bars, and so on down until we reach the lower ends of the grate bars along the plane 9—9, whereupon the widest of all openings will occur. These facts are illustrated in Figures 6 to 9 inclusive, and the function of these various openings is as follows:

Of course, it is desirable in shaking grate bars to lose as little of the unconsumed fuel as possible, while it is also desirable to eliminate as much of the ashes as possible. The narrow or smaller openings 57 which are close to the central supporting section 6 are too small to permit any considerable quantity of unconsumed fuel to pass, while they are of sufficient dimensions to permit the consumed particles to pass. The next lower rows of openings 58 are wider than are the row of openings 57, and they will permit larger particles to pass, but there is less unconsumed particles of fuel in their vertical planes to pass through said openings 58 than there are in the plane of the openings 57, so that one can afford to open them wider than is the case with the openings 57. The openings 59 are in the path of travel of still less unconsumed fuel, and therefore these said openings can be made still wider, and finally when we get down to the lower trunnions 4 or to the lower ends 55 of the individual grate bars, there is very little unconsumed fuel to lose, so that the openings 60 may be made the widest of all. The result is that upon shaking the grate bars made in accordance with this invention, one rapidly and economically cleans the fuel of ashes and other worthless particles, while at the same time, he preserves the maximum quantity of useful unconsumed fuel.

The trunnions 4 and 4' of the individual grate bars being centrally and symmetrically disposed, and the flanges 46 to 52 being also symmetrically disposed on each side of said trunnions, the grate bars may be operated to tilt in both directions or to both the right and to the left hand side of the vertical plane passing through said trunnions so that it is immaterial whether a given grate bar is placed on the right hand side or the left hand side of the furnace. Further, it is immaterial how the operator reciprocates the shaking members 32 and their associated parts, for precisely the same character of openings results, whether the members 14 of the grate bars are moved to one side or to the other of said vertical planes.

In addition to this, the link members 18 and their associated parts all being made of duplicate sizes, as above mentioned, and the individual grate bars 40 to 45 being made of duplicate sizes as just disclosed, it is evident that the cost of manufacture is greatly reduced, as well as the cost of repairs, for whenever one part wears out it can be readily replaced with a duplicate part.

It will now be clear that the construction disclosed embodies a plurality of grate bars pivoted side by side on their trunnions 4 and 4', and that said bars are provided on each edge with depending flanges 46 to 52, which get progressively shorter from one end to the other of said bars, and which are adapted when said bars are tilted to form openings of a width inversely proportional to the lengths of said flanges. It will also be observed that at each end of each series of grate bars or at the front and back thereof there are stationary bars such as 69, 70, 71, and 72, which are likewise provided with depending flanges coacting with the depending flanges 46 to 52 on said grate bars to form openings of predetermined dimensions at the front and back of the grate.

It is convenient to air cool the member 6 to prolong its life, and to this end said member is made hollow and provided with the holes 75.

It is obvious that those skilled in the art may vary the details of construction as well as the arrangement of parts without departing from the spirit of the invention and therefore I do not wish to be limited to the above disclosure except as may be required by the claims.

What I claim is:

1. In a grate apparatus the combination of a plurality of pivoted grate bars having centrally disposed trunnions; depending flanges of different lengths disposed on each side of said trunnions adapted to form openings of different dimensions between the ends of said bars when the latter are tilted; and means for tilting said flanges around said trunnions to form said openings.

2. In a grate apparatus the combination of a grate bar provided with means for pivoting the same and with depending flanges of different lengths disposed on each side of said pivoting means adapted to form walls of different sized openings when said flanges are tilted: and similar flanges of different lengths coacting with said first named flanges to form other walls of said openings.

3. The herein described new grate bar the same consisting of a body portion having trunnions at each end; depending flanges on each side of said trunnions of shorter and shorter lengths from one end to the other of said bar; and depending means adapted to aid in oscillating said flanges about said trunnions.

4. In a grate apparatus the combination of a plurality of pivoted grate bars having centrally disposed trunnions; depending flanges of successively different lengths disposed on each side of said trunnions adapted to form openings of different dimensions between portions of said bars; and reciprocating means for tilting said flanges around said trunnions to form said openings.

5. In a grate apparatus the combination of a plurality of perforated pivoted grate bars having centrally disposed trunnions; depending flanges of successively different lengths symmetrically disposed on each side of said trunnions adapted to form successive openings of different dimensions between portions of said bars; and interchangeable, reciprocating means for tilting said flanges around said trunnions in opposite directions to form said openings.

6. In a grate apparatus the combination of a grate bar provided with centrally disposed means for pivoting the same and with depending flanges of successively different lengths disposed on each side of said pivoting means adapted to form walls of different sized openings when said flanges are tilted; and similar flanges of different lengths coacting with said first named flanges to form other walls of said openings.

7. In a grate apparatus the combination of a plurality of interchangeable perforated grate bars each provided with a trunnion at each end; perforations between said trunnions and depending symmetrically disposed flanges of successively different lengths disposed on each side of said trunnions; said flanges of succeeding bars when tilted in the same direction adapted to form openings of different dimensions with the tops of preceding bars; and reciprocating means adapted to tilt said bars to form said openings.

8. In a grate apparatus the combination of a plurality of interchangeable grate bars each provided with a trunnion at each end and with perforations through their top surfaces between said trunnions, said bars also provided with depending flanges of successively different lengths disposed on each side of said trunnions and with perforations through said flanges; said flanges of succeeding bars when tilted in the same direction adapted to form openings of different dimensions with the perforated tops of preceding bars; and interchangeable reciprocating means provided with means to prevent mistakes in assembling the same adapted to tilt said bars to form said openings.

9. In a grate apparatus the combination of a plurality of pivoted grate bars provided with depending flanges adapted to provide openings of different sizes for the passage of ashes; means for tilting said bars to form said openings comprising interchangeable links provided with means to prevent mistakes in assemblage; and means to reciprocate said links and bars.

10. In a grate apparatus the combination of a plurality of inclined oscillating pivoted grate bars having depending flanges of different lengths on opposite sides of their pivots; a hollow air cooled supporting member for one end of said grate bars; and means to oscillate said bars.

In testimony whereof I affix my signature.

MERRIMAN C. GILLETT.